United States Patent [19]

Hayakawa et al.

[11] Patent Number: 5,575,291
[45] Date of Patent: Nov. 19, 1996

[54] ULTRASONIC COUPLER

[75] Inventors: Kenichi Hayakawa; Kiyoto Matsui, both of Kawasaki, Japan

[73] Assignee: Fujitsu Ltd., Kawasaki, Japan

[21] Appl. No.: 306,320

[22] Filed: Sep. 15, 1994

[30] Foreign Application Priority Data

Nov. 17, 1993 [JP] Japan .................................. 5-288116

[51] Int. Cl.⁶ ...................................................... A61B 8/00
[52] U.S. Cl. ................................. 128/662.03; 128/663.01
[58] Field of Search ..................... 128/662.03, 663.01; 426/1; 522/5; 525/55

[56] References Cited

U.S. PATENT DOCUMENTS

| | | | |
|---|---|---|---|
| 3,875,302 | 4/1975 | Inoue | 426/1 |
| 4,901,729 | 2/1990 | Saitoh et al. | 128/662.030 |
| 5,078,149 | 1/1992 | Katsumoto et al. | 128/662.030 |
| 5,106,876 | 4/1992 | Kawamura | 522/5 |
| 5,265,614 | 11/1993 | Hayakawa et al. | 128/662.030 |

FOREIGN PATENT DOCUMENTS

| | | | |
|---|---|---|---|
| 4332542 | 11/1992 | Japan | 128/662.03 |
| 4332543 | 11/1992 | Japan | 128/662.030 |
| 5042136 | 2/1993 | Japan | 128/662.030 |
| WO90/01902 | 3/1990 | WIPO . | |

*Primary Examiner*—Francis Jaworski
*Attorney, Agent, or Firm*—Staas & Halsey

[57] ABSTRACT

An ultrasonic coupler to be arranged between an ultrasonic probe and a patient to be examined using an ultrasonic diagnostic apparatus is provided. A method of producing the ultrasonic coupler is also provided. The ultrasonic coupler is made of a gel material having no tackiness. According to the present invention, an ultrasonic coupler includes the gel material which contains polyvinyl alcohol in the range of 3 weight % to 6 weight %. The polyvinyl alcohol is at least 98.0 mole % in the degree of saponification, and the gel material has a hardness in the range of $0.5 \times 10^4$ dyne/cm² to $2 \times 10^4$ dyne/cm². A coupling member for holding the ultrasonic coupler in contact with the ultrasonic probe is fixed to the gel material. The method of producing the ultrasonic coupler includes a step of providing a mold having an interior chamber. A coupling member projects into the interior chamber, and has an attachment portion inserted into the mold. The attachment portion has a shape adapted for fitting on the ultrasonic probe. An aqueous solution is injected into the interior chamber. After the injection, at least one operation of freezing and defrosting the aqueous solution is performed, thereby transforming the aqueous solution into a gel material. Finally, the mold is separated from the gel material while allowing the coupling member to be embedded in the gel material with the attachment portion protruding from the gel material.

6 Claims, 5 Drawing Sheets

ULTRASONIC COUPLER

BACKGROUND OF THE INVENTION

1. Field of the Invention

The present invention relates to an ultrasonic coupler to be arranged between an ultrasonic probe and a subject to be observed, the ultrasonic coupler being adapted for use in an ultrasonic diagnostic apparatus.

2. Description of the Related Art

Ultrasonic diagnostic apparatuses which produce tomographic images of human bodies using ultrasonic waves are widely used. Observation of a diagnostic site of a human body, such as a thyroid gland, a carotid and a mammary gland, using an ultrasonic diagnostic apparatus is described below, referring to the accompanying drawings.

FIG. 5 is a typical diagram showing the ultrasonic probe for transmitting and receiving ultrasonic waves, which probe is kept in direct contact with a surface of a human body. FIG. 6 is a typical diagram showing the ultrasonic coupler, which is an excellent ultrasonic transmitting material, arranged between the ultrasonic probe and the surface of the human body to be observed.

When the ultrasonic probe 10 directly contacts the body surface 12, as shown in FIG. 5, an ultrasonic beam 16 is converged to an internal position away from the body surface 12. Therefore, if a diagnostic site 18 located near the body surface 12 is observed while the ultrasonic probe 10 is kept in direct contact with the body surface 12, the resolving power of the ultrasonic diagnostic apparatus will deteriorate. To improve the resolving power in observation of a diagnostic site 18 near the body surface 12, an ultrasonic coupler 20 (see FIG. 6) is arranged between the ultrasonic probe 10 and the body surface 12, thus causing the ultrasonic beam 16 to converge at a position nearby the diagnostic site 18.

The ultrasonic coupler 20 is manufactured by using a non-hydrated (non-water-containing) gel material such as urethane rubber or silicone rubber, or a high-molecular weight, hydrated (water containing) gel material such a polyvinyl alcohol (hereafter referred to as "PVA"), polyvinyl pyrrolidone (hereafter referred to as "PVP") and polyethylene oxide (hereafter referred to as "PEO").

Generally, ultrasonic waves are substantially attenuated in the non-hydrated gel material (approximately 2dB/cm/MHz). Therefore, ultrasonic waves transmitted from the ultrasonic probe become attenuated when passing through the ultrasonic coupler made of a non-hydrated gel material. Accordingly, it is difficult to transmit ultrasonic waves into a subject to be observed, and ultrasonic waves reflected from the internal site of the subject to be observed also become attenuated when passing through this ultrasonic coupler. Consequently, there is a problem in that the S/N ratio is undesirably low when using an ultrasonic coupler made of non-hydrated gel material.

On the other hand, attenuation of ultrasonic waves in the high-molecular weight hydrated gel material is extremely small (approximately 0.1 dB/cm/MHz). Therefore, a high S/N ratio can be obtained by using an ultrasonic coupler made of the high-molecular weight, hydrated gel material.

An aqueous solution which contains PVA as the high-molecular weight, hydrated gel material has a characteristic that bridge formation among molecules proceeds and the aqueous solution is gelled when it is frozen at a temperature below the freezing point and defrosted at room temperature. This gelled material (PVA gel material) excels in tear strength and elasticity and provides excellent mechanical characteristics, which meet the ultrasonic coupler (refer to Japanese Patent Publication No. 47-12854). Therefore, various types of ultrasonic couplers, made of PVA gel materials, manufactured by various methods have been proposed.

EXAMPLE 1

There has been disclosed an ultrasonic coupler made of a hydrated gel material which is produced by freezing an aqueous solution containing PVA at a temperature from –45° C. to –15° C. for 3 to 30 hours and defrosting it at room temperature. This ultrasonic coupler is made of a hydrated gel material of 1720 in the degree of polymerization, 98 mole % in the degree of saponification, and 10 weight % in PVA. There has also been disclosed an ultrasonic coupler made of a hydrated gel material, which is produced through freezing treatment of a PVA aqueous solution, of 99.5 mole % or over in the degree of saponification (refer to Japanese Patent Application Laid-Open No. 55-63636).

EXAMPLE 2

There has been disclosed an ultrasonic coupler made of a hard hydrated gel material of 6 weight % of PVA which is produced by repeating a freezing and defrosting process, two times or more. For this ultrasonic coupler, bridge formation proceeds each time freezing and defrosting are repeated. Therefore, the hydrated gel material becomes a hard gel (refer to Japanese Patent Application Laid-Open No. 59-56446).

EXAMPLE 3

There has also been disclosed an ultrasonic coupler made of a hydrated gel material which is produced by freezing a PVA aqueous solution of 99.3 mole % in the degree of saponification and 12 weight % of PVA at –50° C. for 24 hours and defrosting it at room temperature for 30 minutes (refer to Japanese Patent Application Laid-Open No. 59-49750). There has also been disclosed an ultrasonic coupler made of a hydrated gel material which is produced by freezing a PVA aqueous solution of 98.5 mole % in the degree of saponification and 20 weight % of PVA at –30° C. for 36 hours and defrosting it at room temperature (refer to Japanese Patent Application Laid-Open No. 59-49750).

EXAMPLE 4

There has been disclosed an ultrasonic coupler made of a transparent, non-fluid, highly hydrated gel material with tackiness which is produced by repeating, 3 to 10 times, a freezing process on a PVA aqueous solution having a degree of saponification in the range of 75 to 95 mole % and a degree of PVA in the range of 7 to 30 weight % containing PVA of 1000 in the mean degree of polymerization at –10° C. or under and subsequently defrosting it (refer to Japanese Patent Application No. 62-298342).

When diagnosing the cervical region, where undulations of the body surface are steep, using the ultrasonic coupler, the emitted ultrasonic energy is substantially attenuated even if there is a small clearance, possibly filled with air, between the ultrasonic emitting surface of the ultrasonic probe and the body surface. However, the hydrated gel materials disclosed in the above examples of the related art are hard, and therefore the ultrasonic couplers made of these hydrated gel materials cannot deform sufficiently to tightly fit the steep undulations of the body surface. When one of these ultrasonic couplers is applied to the body surface, a clearance is formed between the ultrasonic coupler and the body surface and air remains therebetween. There has accordingly been a problem that the S/N ratio deteriorates to cause the diagnosis to be difficult.

When measuring blood flow in a blood vessel (blood backscattering) near the body surface, using the ultrasonic coupler made of a hard hydrated gel material described in the above Examples 1 to 3, the blood vessel is deformed by the ultrasonic coupler since the ultrasonic probe is depressed against the body surface. Consequently, a problem arises that the blood flow cannot be accurately measured.

In additional, in producing the ultrasonic couplers described in the Examples 1 to 3 of the related art, the freezing operation and the defrosting operation are respectively carried out only once. Therefore, there is a problem in that the hydrated gel materials are poor in stability and expand or shrink over time.

On the other hand, a highly hydrated gel material described in Example 4 of the related art is flexible, but it has a tackiness. When the ultrasonic coupler made of this highly hydrated gel material is applied to the body surface and detached from it, a portion of the highly hydrated gel material partly remains on the body surface. Therefore, there is a problem that, if part of the highly hydrated gel material remains on the body surface, such remaining gel material gives a discomfort to a person inspected, and moreover, it is troublesome to remove the remaining gel material.

SUMMARY OF THE INVENTION

It is an object of the present invention to address the above problems. More specifically, it is an object of the present invention to provide an ultrasonic coupler made of a gel material which has no tackiness and is flexibly deformable to fit closely with a body surface.

An ultrasonic coupler according to the present invention, to attain the above object, is characterized in that the ultrasonic coupler is made of a gel material containing from 3 to 6 weight % of PVA, having 98.0 mole % in the degree of saponification and having a hardness in the range of $0.5 \times 10^4$ dyne/cm$^2$ to $2 \times 10^4$ dyne/cm$^2$.

In this case, the PVA preferably has a degree of saponification of 99.0 mole % or over.

It is also preferable to fix a coupling member, for coupling the gel material to the ultrasonic probe, to this gel material.

In addition, it is preferable to form the gel material to be integral with the coupling member, thereby fixing the coupling member to the gel material.

Furthermore, it is preferable to form the gel material and the coupling member to be integral with each other so that the gel material passes through holes provided in the couple member.

The gel material which forms the ultrasonic coupler according to the invention is flexible without tackiness, and therefore is slippery and inconvenient to handle. For this reason, a coupling member is fixed to the gel material to facilitate fitting of the ultrasonic coupler to the ultrasonic probe. Forming the gel material with the coupling member (within the mold) is an easy way to fix the coupling member to the gel material. When the gel material and the coupling member ate formed together so that the gel material passes through the holes provided in the coupling member, the coupling member can be more firmly fixed to the gel material.

As described above, the ultrasonic coupler according to the invention is flexible and can fit the profile of a body surface with steep undulations, thereby ensuring accurate diagnosis. The gel material does not have a tackiness and therefore does not remain on the body surface after the ultrasonic coupler has been detached from the body surface. Accordingly, the patient examined does not feel any discomfort or the need to remove the gel material after the diagnosis. In addition, the gel material has a time-elapsed stability, and thus, even an ultrasonic coupler which has been stored for a long period of time ensures accurate diagnosis.

BRIEF DESCRIPTION OF THE DRAWINGS

Hereinafter, preferred embodiments of the invention will be described with reference to the accompanying drawings, in which.

DETAILED DESCRIPTION OF THE PREFERRED EMBODIMENTS

Figure 1:
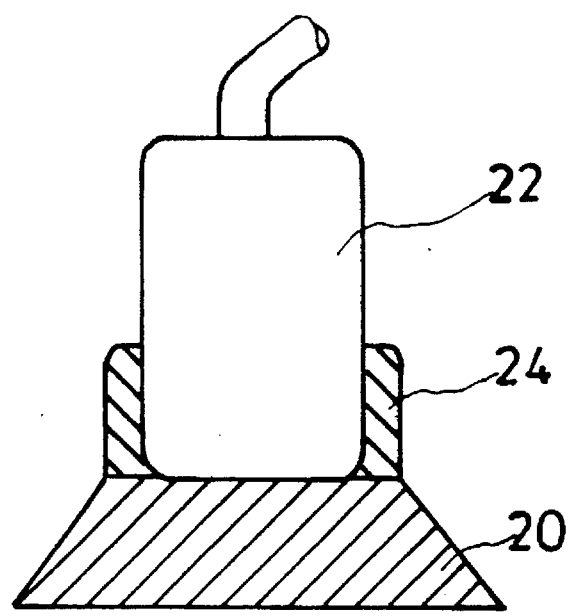
FIG. 1 is a typical sectional diagram showing a coupling member coupling an ultrasonic coupler according to the present invention to an ultrasonic probe.

Preferred embodiments of an ultrasonic coupler according to the present invention are described below, referring to the Comparative Examples and the appended drawings.

The gel material which forms an ultrasonic coupler according to the present invention contains PVA in the range of 3 to 6 weight %, a degree of saponification of 98.0 mole % and a hardness in the range of $0.5 \times 10^4$ dyne/cm$^2$ to $2 \times 10^4$ dyne/cm$^2$. Therefore, the gel material is flexible but does not have undesired tackiness. Accordingly, when applying the ultrasonic coupler of the invention to a body surface with steep undulations, the ultrasonic coupler deforms to fit the undulations, even if it is not strongly applied to the body surface. Therefore, no clearance is formed between the ultrasonic wave emitting surface of the probe and the body surface, and the site to be diagnosed will not be deformed. Consequently, a body surface with steep undulations can be accurately diagnosed. The gel material does not have tackiness and will not remain on the body surface after the ultrasonic coupler has been removed from it. Accordingly, after the diagnosis, the patient will not feel a discomfort or the need to remove remaining gel material. Moreover, the gel material provides time-elapsed stability and, therefore, even an ultrasonic coupler which has been stored for a long time can be used for accurate diagnosis.

When a PVA having 99.0 mole % or over in the degree of saponification is used, more preferable effects can be obtained. However, if a PVA having less than 98.0 mole % in the degree of saponification is used, a gel material which has a tackiness is produced When the PVA is less than 3 weight % a gel material poor in water holding capacity is obtained, and the ultrasonic coupler cannot be maintained in a specified shape. When the PVA exceeds 6 weight %, a hard gel material is produced, and therefore the resulting ultrasonic coupler lacks flexibility. If the mean degree of polymerization is 1000 or over, a stable gel material is obtained.

For producing the ultrasonic coupler according to the invention, a preferable freezing temperature is −10° C. or under. The reason for this temperature is that a lower freezing temperature produces a more stable gel material in a short period of time. The freezing process requires two hours or more at the reduced temperature. Bridging formation among PVA molecules is insufficient if the freezing time is less than two hours. Therefore, a gel material which does not have shape holding capacity is produced, as in the case of low PVA weight It is preferable that the freezing temperature is −20° C. and the freezing time is 12 hours or more. A gel material which is stable over time can be produced by repeatedly freezing and defrosting, two times or more. However, if the number of times of freezing and defrosting operations is excessively large, bridge formation is accelerated, and the gel material shrinks. Therefore, two repetitions of freezing and defrosting is most suitable.

Embodiment 1

A gel material was produced by repeating a freezing and defrosting operation two times. Each operation included freezing at −20° C. for 24 hours an aqueous solution in which 5 weight % of PVA is dissolved, followed by defrosting. The PVA is 99.5 mole % in the degree of saponification and 1700 in the mean degree of polymerization. The hardness of the resulting gel material produced is $1 \times 10^4$ dyne/cm$^2$. Therefore, the gel material has sufficient flexibility to allow its profile to vary in accordance with the uneven shape of the human body. Also, the gel material does not have tackiness. An attenuation factor of ultrasonic waves for the gel material is as small as 0.2 dB/cm/MHz and the acoustic impedance is approximately $1.52 \times 10^6$ kg/m$^2$/s. The gel material thus excels in acoustic matching performance for a human body.

COMPARATIVE EXAMPLE 1

A gel material was produced by repeating a freezing and defrosting operation two times. Each operation included freezing at −20° C. for 24 hours an aqueous solution in which 5 weight % of PVA is dissolved followed by defrosting. The PVA is 98 mole % in the degree of saponification. A second aqueous solution having 10 weight % of PVA was also used. The hardness of the gel material produced from the aqueous solution in which 10 weight % of PVA was dissolved is $5 \times 10^3$ dyne/cm$^2$. The hardness of the gel material produced from the 5 weight % is unknown. Both gel materials exhibited tackiness and a weak tear strength. When an ultrasonic coupler made of this gel material is directly applied to and detached from a body surface, and the gel material is easily torn because of its weak tear strength.

COMPARATIVE EXAMPLE 2

Freezing at −20° C. for 24 hours of an aqueous solution in which 10 weight % of PVA of 89 mole % in the degree of saponification was performed, followed by defrosting. This operation was repeated two times. However, the aqueous solution did not gel and remained a liquid.

COMPARATIVE EXAMPLE 3

A gel material was produced by repeating a freezing and defrosting operation two times. Each operation included freezing at −20° C. for 24 hours an aqueous solution in which 2 weight % of PVA is dissolved, followed by defrosting. The PVA is 99.5 mole % in the degree of saponification The gel material thus produced exhibited tackiness and weak tear strength to the extent that its hardness could not be measured. Accordingly, an ultrasonic coupler made of this gel material would be unsuitable for practical use for reasons similar to those for the ultrasonic coupler in Comparative Example 1.

COMPARATIVE EXAMPLE 4

A gel material was produced by repeating a freezing and defrosting operation four times. Each operation included freezing at −20° C. for 24 hours an aqueous solution in which 2 weight % of PVA is dissolved followed by defrosting. The PVA is 99.5 mole % in the degree of saponification. The hardness of the resulting gel material is $5 \times 10^3$ dyne/cm$^2$. This gel material does not have the tackiness, but has a weak tear strength. When an ultrasonic coupler is made of this gel material and such coupler is placed in direct contact with a body surface, water contained in the gel material oozes out from the pressure, and the gel material cannot maintain a regular shape.

COMPARATIVE EXAMPLE 5

A gel material was produced by conducting a series of freezing and defrosting operations. Each operation included freezing at −20° C. for 24 hours an aqueous solution in which 5 weight % of PVA is dissolved, followed by defrosting. The PVA is 99.5 mole % in the degree of saponification. The hardness of the gel material thus produced is $5 \times 10^3$ dyne/cm$^2$. This gel material does not have the tackiness, but has a weak tear strength. Accordingly, an ultrasonic coupler made of this gel material is unsuitable for practical use for reasons similar to those for the ultrasonic coupler in Comparative Example 1.

COMPARATIVE EXAMPLE 6

A gel material was produced by conducting a freezing and defrosting operation. Each operation included freezing at −20° C. for 24 hours an aqueous solution in which 8 weight % of PVA is dissolved, followed by defrosting. The PVA is 99.5 mole in the degree of saponification. The hardness of the gel material thus produced is $1 \times 10^3$ dyne/cm$^2$. This gel material does not have the tackiness and has the flexibility. Accordingly, the flexibility of an ultrasonic coupler made of this gel material allows the shape of the coupler to vary with the shape of the body surface. However, the hardness of the gel material increases over time and is twice hard as the original hardness after one month, and therefore the gel material will then lack the requisite flexibility.

COMPARATIVE EXAMPLE 7

A gel material was produced by conducting two freezing and defrosting operations. Each operation included freezing at −20° C. for 24 hours an aqueous solution in which 8 weight % of PVA is dissolved, followed by defrosting. The PVA is 99.5 mole in the degree of saponification. The hardness of the gel material thus produced is $2 \times 10^4$ dyne/cm$^2$. This gel material does not have the tackiness but lacks the flexibility. Accordingly, an ultrasonic coupler made of this gel material is unsuitable for accurate diagnosis of a body surface with steep undulations.

Measurements of the hardness in the Embodiment and Comparative Examples described above were conducted using the Cardmeter Max (Model ME-30-3 manufactured by Iiwo Electric Industry Co., Ltd.) with a pressure sensitive axial diameter of 8 mm and a spring which is loaded with 400 g weight.

An embodiment according to which a coupling member for coupling the ultrasonic coupler to the ultrasonic probe is described below, referring to FIG. 1.

The gel material which forms the ultrasonic coupler 20 according to the invention is not tacky, is flexible and therefore is slippery and cannot be held without inconvenience in handling. Therefore, a coupling member 24 for holding the ultrasonic coupler 20 in contact with the ultrasonic probe 22 is fixed to the gel material. This allows the ultrasonic coupler to be easily fitted to the ultrasonic probe 22 for practical use. The coupling member 24 is made of plastic or rubber and formed to fit the profile of the ultrasonic probe 22 onto which it is to be fitted. A part of the coupling member 24 to which the ultrasonic probe 22 is to be fitted may have an inner diameter smaller than the width of the ultrasonic probe 22 so that the ultrasonic probe 22 stretches to fit snugly within the coupling member 24.

A method for manufacturing the ultrasonic coupler with the coupling member fixed to the gel material is described below, referring to FIGS. 2A–2G.

FIGS. 2A–2G are sectional views showing the ultrasonic coupler and associated elements in various stages of a first method of production.

The ultrasonic coupler manufacturing mold 30 comprises an upper mold 32 and a lower mold 34. The upper mold 32 is provided with an inlet port 36 for injecting an aqueous solution containing a high-molecular weight, PVA-based compound. A convex part 35 which forms a coupling surface between the ultrasonic probe (not shown) and the ultrasonic coupler is provided at the center of the lower mold 34. In addition, a coupling member 37 for coupling the ultrasonic probe and the ultrasonic coupler is fitted to this convex part 35.

Figure 2A:
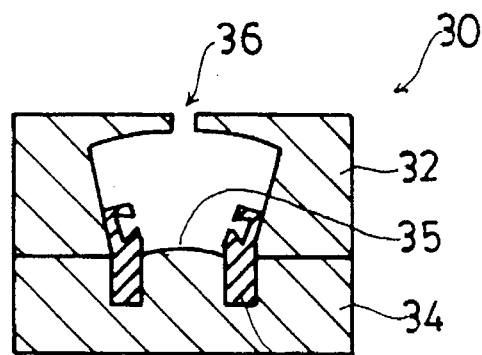
FIGS. 2A–2G are sectional views showing the ultrasonic coupler and associated elements in various stages of a first method of production.
Figure 2E:
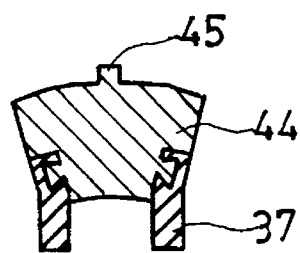
Figure 2B:
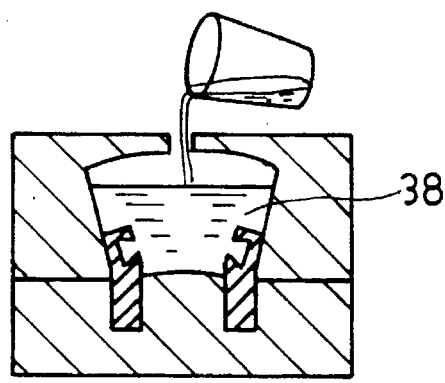
Figure 2F:
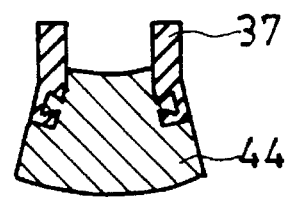
Figure 2C:
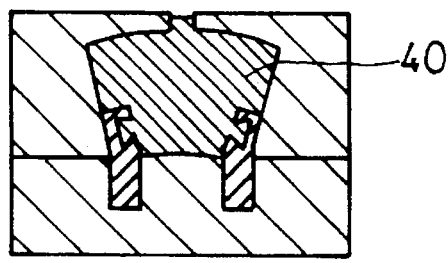
Figure 2D:
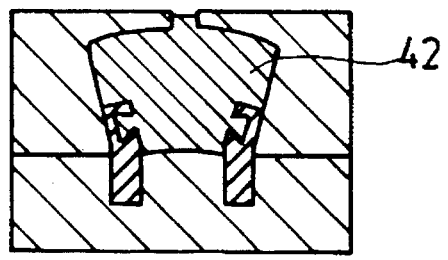
Figure 2G:
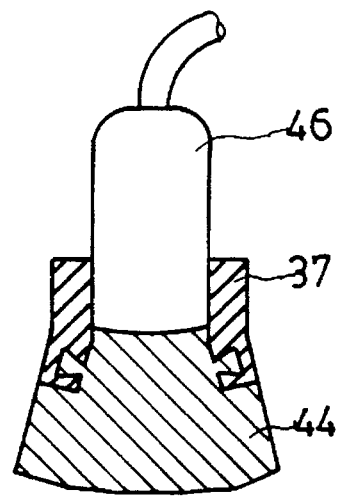

For producing the ultrasonic coupler, an aqueous solution 38 containing a high-molecular weight, PVA-based liquid is injected into mold 30 through the inlet port 36, as shown in FIG. 2B. The mold 30, filled with the aqueous solution 38, is cooled to a temperature below the freezing point and then returned to room temperature. This operation is repeated for bridge formation of PVA, thus promoting gelling. The aqueous solution 38 containing the high-molecular weight, PVA-based compound increases in volume by approximately 10% when it is frozen. The compound returns to its original volume at room temperature. Thus, expansion and shrinkage are repeated with the operation. Since the upper mold 32 and the lower mold 34 which form the mold 30 are respectively made of silicone rubber, the mold 30 expands, as shown in FIG. 2C, in accordance with expansion of the aqueous solution 38 to frozen compound 40, which is frozen at a temperature below the freezing point. Accordingly, the mold 30 is not damaged during the process. The upper mold 32 and the lower mold 34 do not disengage, forming a flash part which protrudes from the mold 30. After repeating the operation of cooling at a temperature below the freezing point and returning to room temperature, as many times as specified, the gel 42 which has been defrosted to room temperature meets the shape of the ultrasonic coupler producing mold 30, as shown in FIG. 2D. A gate part 45 formed on the ultrasonic coupler 44, which has been parted from mold 30, is removed, as shown in FIG. 2E. This yields the ultrasonic coupler 44, formed in a specific shape, which is provided with the coupling member 37, as shown in FIG. 2F. For use with an ultrasonic diagnostic apparatus (not shown), the gel material and the ultrasonic probe 46 are firmly coupled by pushing the ultrasonic probe 46 into the coupling member 37, as shown in FIG. 2G, and therefore high operation efficiency is ensured.

According to the ultrasonic coupler producing method which uses the ultrasonic coupler producing mold, the ultrasonic coupler can be produced integrated with and fixed to the coupling member. The ultrasonic coupler excels in smoothness of the coupling surface since the convex part 35, which fits the shape of the ultrasonic probe, is formed in the lower mold.

Another method for producing an ultrasonic coupler in which a coupling member is fixed to a gel material is described below, referring to FIGS. 3A–3G.

FIGS. 3A–3G are sectional views showing another method for producing the ultrasonic coupler and showing an ultrasonic coupler producing mold to be used with the other method.

Figure 3A:
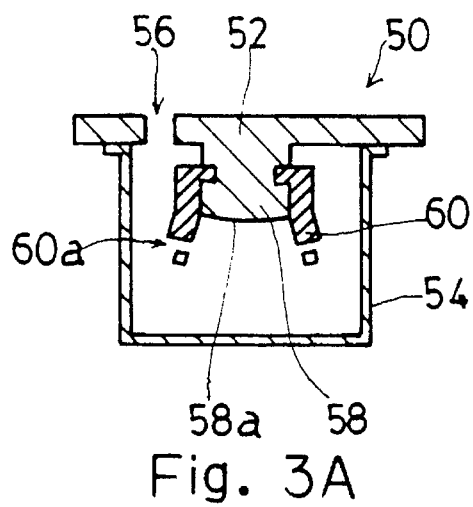
FIGS. 3A–3G are sectional views showing the ultrasonic coupler and associated elements in various stages of a second method of production.

As shown in FIG. 3A, an ultrasonic coupler producing mold 50 comprises an upper mold 52 and a lower mold 54. An inlet port 56 for injecting an aqueous solution containing PVA is formed in the upper mold 52. A convex part 58 with a surface 58a, forming a coupling surface between the ultrasonic probe (not shown) and the ultrasonic coupler, is provided at the center of the upper mold 52. The ultrasonic coupler is formed in the bottom of the mold. In addition, a coupling member 60 for coupling the ultrasonic probe and the ultrasonic coupler is fitted to the convex part 58. The coupling member 60 is provided with a plurality of holes 60a through which the gel material is inserted.

Figure 3B:
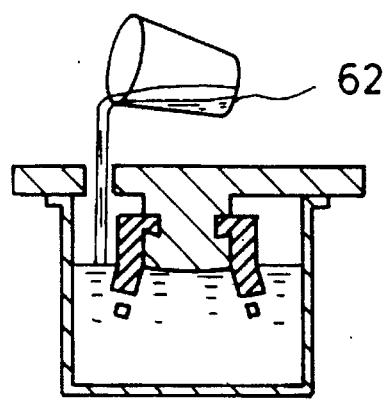
Figure 3C:
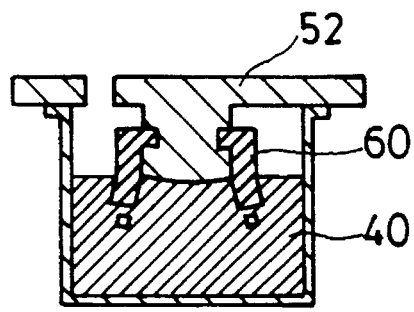
Figure 3D:
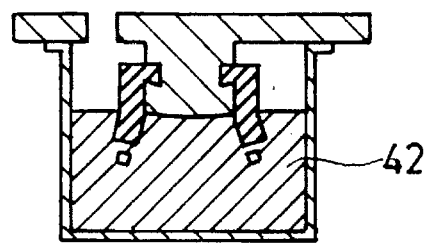

For producing the ultrasonic coupler, an aqueous solution 62 containing a high-molecular weight, PVA-based compound is injected into the mold 50 through the inlet port 56, as shown in FIG. 3B. The aqueous solution 62 can be injected until the coupling surface 58a is covered and need not be injected until the internal space of the mold 50 is completely filled. After the aqueous solution 62 has been injected into the mold 50, an operation for cooling to a temperature below the freezing point and defrosting to room temperature is repeated, as many times as specified. FIG. 3C shows the frozen PVA compound 40, and FIG. 3D shows the defrosted PVA compound 42.

Figure 3E:
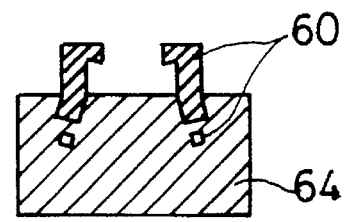
Figure 3F:
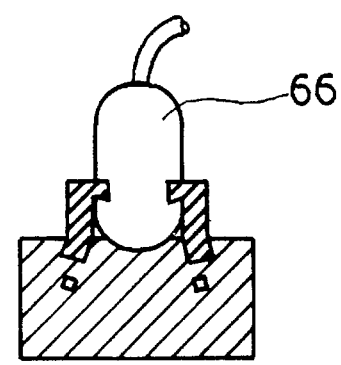
Figure 3G:
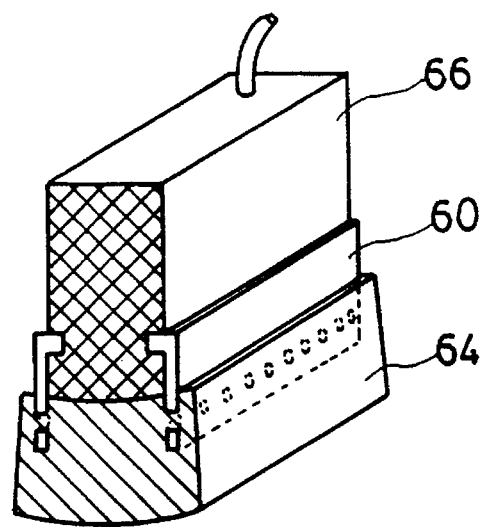

The coupling member 60 is fitted to the ultrasonic coupler 64 after having been parted from the mold, as shown in FIG. 3E. There is no gate part which needs to be removed. An ultrasonic coupler 64 attached to the coupling member 60, for coupling with the ultrasonic probe 66, is produced. For use with an ultrasonic diagnostic apparatus (not shown), the gel material and the ultrasonic probe 66 are firmly coupled by pushing the ultrasonic probe 66 into the coupling member 60, as shown in FIGS. 3F and 3G, and therefore, high operation efficiency is ensured. The gel material according to the present invention has a high tear strength as described above. Therefore, a strong coupling force is obtained by integrated formation, in which the gel material passed through holes 60a formed in the coupling member 60.

Figure 4:
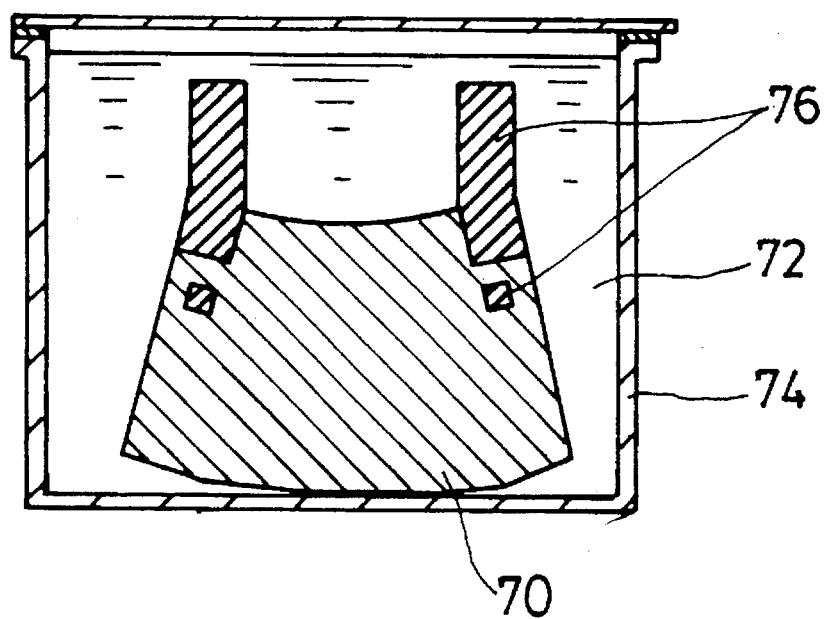
FIG. 4 is a sectional view showing an example of a method for storing the ultrasonic coupler over an extended period according to the invention.
Figure 5:
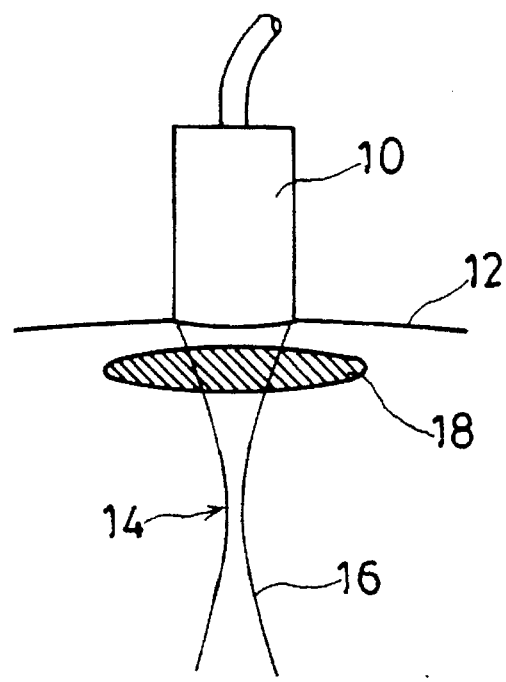
FIG. 5 is a diagram showing a conventional ultrasonic probe for transmitting and receiving ultrasonic waves which is kept in direct contact with a body surface of a patient.
Figure 6:
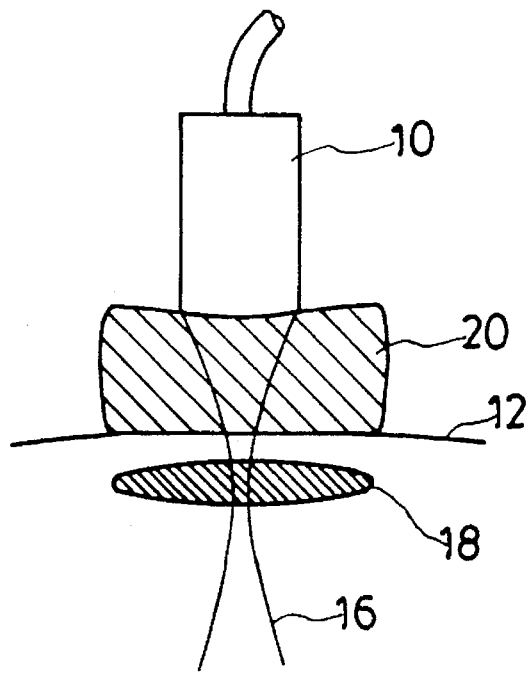
FIG. 6 is a diagram showing a conventional ultrasonic coupler between the ultrasonic probe and the body surface.

A method of archiving (storing) the ultrasonic coupler according to the present invention is described below, referring to FIG. 4.

The gel material which forms the ultrasonic coupler 70 according to the present invention has a low PVA weight % and is slightly inferior in its water molecule holding capacity. Therefore, when pressure is applied to the gel materia, water is apt to ooze out. The density of the gel material is almost equal to that of water, and therefore, applied pressure due to the weight of the gel material is eliminated and separation of water from the gel material is prevented by storing the gel material in a container 74 filled with a preservation liquid 72. The preservation liquid 72 contains water as a main component (only water is acceptable). If the ultrasonic coupler 70 is fixed to the coupling member 76, when stored, it is easy to take the ultrasonic coupler 70 from the container 74.

Preferred embodiments of the present invention have been described above. However, the present invention is not limited to these embodiments, but variations and modifications may be made without departing from the scope of the present invention as defined by the appended claims.

What is claimed is:

1. An ultrasonic device comprising a gel material containing polyvinyl alcohol PVA in the range of 3 weight % <PVA<6 weight %, the polyvinyl alcohol having a degree of saponification of at least 98 mole % and the gel material having a hardness in the range of $0.5 \times 10^4$ dyne/cm$^2$ to $2 \times 10^4$ dyne/cm$^2$.

2. An ultrasonic device according to claim 1, wherein the polyvinyl alcohol has a degree of saponification of at least 99 mole %.

3. An ultrasonic device according to claim 1, further comprising a coupling member for releasably coupling said gel material to an ultrasonic probe, said coupling member being fixed to said gel material.

4. An ultrasonic device according to claim 3, wherein said coupling member is fixed to said gel material by being embedded in a gelatinous mass of said gel material.

5. An ultrasonic device according to claim 3, wherein said coupling member has holes therethrough which are embedded in a gelatinous mass of said gel material, with gel material passing through the holes, thereby fixing the gel material to the coupling member.

6. An ultrasonic device according to claim 1, wherein the gel material has a hardness in the range of $1 \times 10^4$ dyne/cm$^2$ m $2 \times 10^4$ dyne/cm$^2$.

* * * * *